United States Patent Office 3,529,804
Patented Sept. 22, 1970

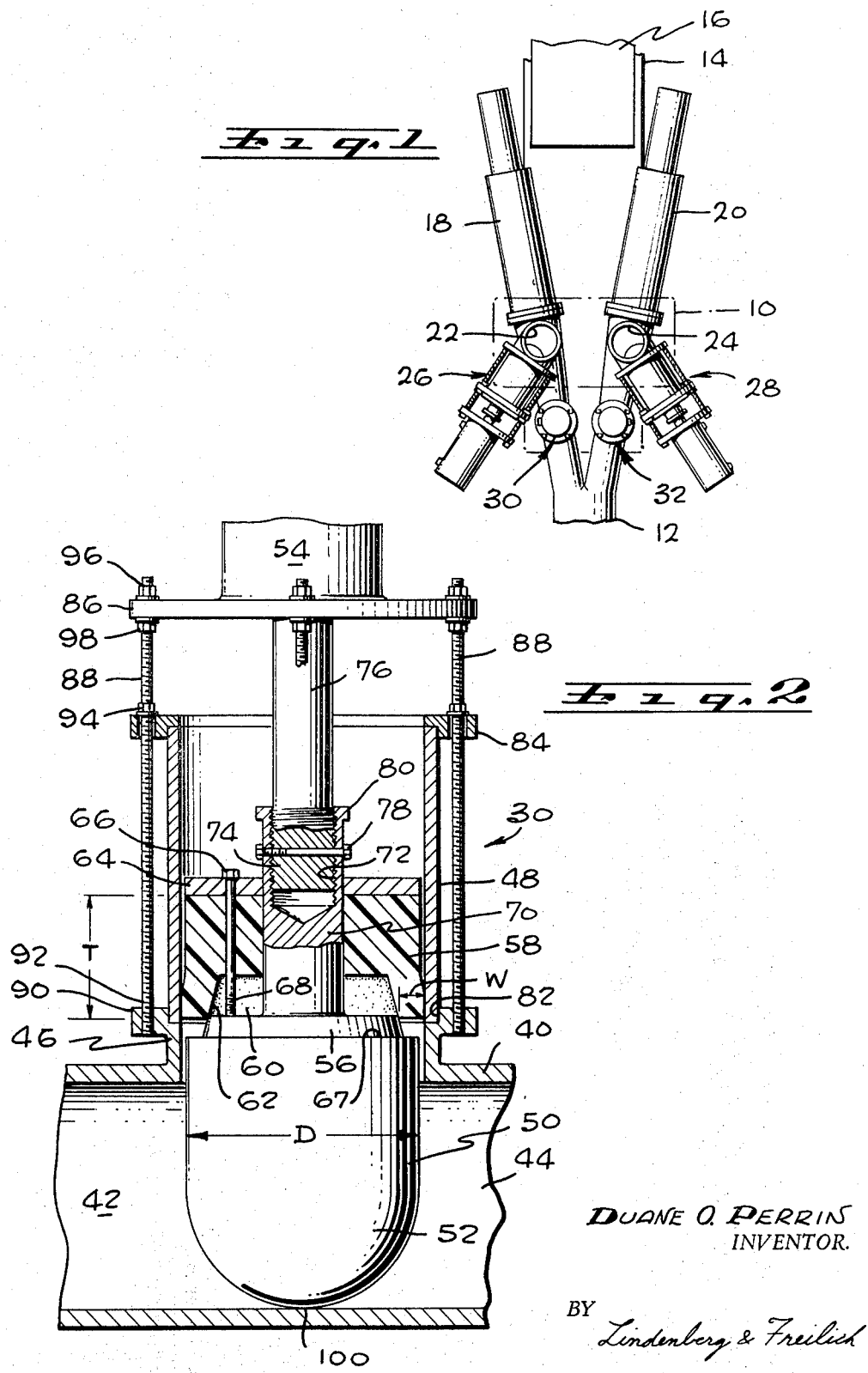

3,529,804
PISTON TYPE VALVE WITH EXPANDABLE SEAL
Duane O. Perrin, 3205 Merrill Drive,
Torrance, Calif. 90503
Filed May 3, 1968, Ser. No. 726,448
Int. Cl. F16k 31/12
U.S. Cl. 251—63.5                                    7 Claims

ABSTRACT OF THE DISCLOSURE

A valve for a concrete pump comprising a valve piston having a front valve-closing portion, a tapered expander member behind the valve closing portion, a thick cup-shaped seal with its hollowed portion disposed over the expander member, and a pressure plate positioned behind the seal. After some wear on the periphery of the seal, the pressure plate is tightened to press the seal against the expander which expands the seal and provides a new peripheral sealing area.

BACKGROUND OF THE INVENTION

Field of the invention

This invention relates to valves.

Description of the prior art

Modern building construction often utilizes machinery for pumping concrete to high levels where it is poured into forms. A common type of concrete pump utilizes rams whose ram cylinders are filled with concrete from a hopper during the backstroke. During the forward stroke, the rams push the concrete into the pipeline which leads to the form. Typically, a pair of rams is utilized, one moving back while the other moves forward to pump concrete into the pipeline.

Each ram requires a pair of valves for its operation. One is the hopper valve which leads to the hoppers. It closes during the forward stroke to prevent concrete from being pumped back into the hopper. The other is the pipeline valve, which lies in front of the ram. The pipeline valve closes during the backstroke to prevent concrete from returning through the pipeline to the ram. Where concrete is pumped to high levels, large pressures are encountered. The high pressures plus the highly abrasive nature of concrete results in large wear on the valve. The wear is extremely hard on the pipeline valve since it is subjected to large pressures during both its open and closed positions.

A typical prior art valve has had the form of a T pipe section in series with the pipeline or hopper. The leg of the T served as the valve cylinder and a valve piston moved through this cylinder to open and close the valve. The piston comprised a front bullet-shaped member of rubber, followed by a thick steel rod. The steel rod had a pair of grooves for holding packing glands. In the case of the pipeline valves, the piston was designed so that during the open valve position, when the bullet was within the cylinder, the pumping pressures would expand the rubber. This would prevent the liquid portion of the concrete, generally referred to as sap, from passing by the piston. The packing glands served as a second barrier to sap leakage during the open valve position, and as the primary barrier when the valve was closed.

The aforedescribed valves often failed to work properly after a brief period of difficult pumping conditions. Typically, after a few hundred cubic yards of concrete had been pumped, the piston would "hang" on the cylinder walls, that is, the piston would not move. The pump would have to be stopped and the piston freed. Hanging and erratic performance would continue for the remaining life of the packing, which was only about 1,000 cubic yards of pumped concrete. The valve assembly would then have to be disassembled and new packing installed to prevent excessive sap leakage. After several thousand cubic yards, the rubber bullet was so worn that the entire piston had to be replaced.

The erratic performance and limited life of the packing glands is largely due to their exposure to the concrete sap, which quickly hardens. Many valve pistons have incorporated grease fittings for continually supplying grease to the packing glands. However, the grease fittings do not substantially extend the lifetime or eliminate erratic performance after several hundred cubic yards have been pumped. They have little effect on the wear of the rubber bullet. The erratic performance and need for repeated changes of the packing glands is costly in that it limits production. In addition, the pistons are costly, and their limited life of only several thousand cubic yards of pumped concrete results in high maintenance costs.

OBJECTS AND SUMMARY OF THE INVENTION

Accordingly, one object of the present invention is to provide a valve which has a longer trouble-free life than valves available heretofore.

Another object is to provide a valve for a concrete pump which is more reliable and durable than valves available heretofore.

In accordance with the present invention, a valve is provided which permits long trouble-free operation, and which is particularly well-adapted to use in concrete pumping machinery. The valve comprises a T-pipe section with a cross portion through which concrete or other material passes. The T section also has a leg which serves as a valve cylinder for holding a valve piston.

The valve piston includes a bullet-shaped valve closing member which moves within the cylinder toward or away from the cross portion, to open or shut off concrete flow through the cross portion. The valve piston also has a tapered section behind the closing member and a cup-shaped valve seal of a soft material positioned on the tapered section. A pressure plate is positioned behind the cup-shaped seal to press it against the tapered section. This forces the seal to expand and provide a tight engagement with the cylinder. After the seal portion in contact with the cylinder is worn, further tightening of the cup-shaped seal against the tapered section provides a new seal area.

In one embodiment of the invention, several bolts are provided which extend between the pressure plate and the expander section, through holes in the seal. The bolts can be tightened to press the pressure plate harder against the seal to expand it. The back of the pressure plate is exposed while the valve is in use so that the bolts can be tightened without disassembling the valve. The cup-shaped seal has a large thickness, on the order of one-half the diameter of the valve, and it prevents the leakage of sap behind the valve piston. The seal is good enough to enable the use of a rigid bullet-shaped valve closer, such as one of steel, at the front of the piston. Both the valve closer and seal have a long life, and the valve has little downtime or maintenance costs.

BRIEF DESCRIPTION OF THE DRAWINGS

FIG. 1 is a plan view of a concrete pump having valves constructed in accordance with the invention; and FIG. 2 is a sectional elevation view of one of the valves of the pump of FIG. 1.

DESCRIPTION OF THE PREFERRED EMBODIMENTS

FIG. 1 illustrates a pump for moving concrete, received in a hopper, indicated at 10, through an outlet 12. The pump comprises a frame 14 which carries an engine 16 and a pair of rams 18 and 20. Concrete dumped into the hopper 10 passes down through feedlines 22 and 24 to areas in front of the rams. The rams push this concrete toward the outlet 12. The two rams operate alternately to provide a relatively continuous flow of concrete.

The concrete pump has four valves, including two hopper valves 26 and 28 and two pipeline valves 30 and 32. As the ram 18 moves to its rearward position, the hopper valve 26 opens to allow concrete to fall into the area in front of the ram. During this time, the pipeline valve 30 is closed to prevent the backflow of concrete into the hopper. The concrete may be pumped to large heights such as several stories, and unless the pipeline valve 30 were closed, concrete would rush back through the feed line 22. When the area in front of the ram 18 is filled and the ram begins its forward stroke, the pipeline valve 30 is opened while the hopper valve 26 is closed. The other ram 20 and valves 28 and 32 operate in a similar manner but at different times.

The valves must withstand difficult operating conditions. During the forward ram stroke, the hopper valves 26 and 28 are subjected to a relatively high pressure on their downward side. The pipeline valves 30 are subjected to even more difficult operating conditions. They have a high pressure on one side during both forward and rearward movement of the rams whose flow they control. The valves must be able to prevent excessive leakage of the sap, and yet be able to withstand the highly abrasive concrete which includes sharp hard rocks.

FIG. 2 shows the details of construction of the pipeline valve 30, which is similar to the construction of the other three valves of the concrete pump. The valve comprises a T section 40 having an upstream end 42 adjacent to the ram and a downstream end 44 adjacent to the outlet of the pump. The T section has a leg 46 which holds a valve cylinder 48. A piston 50 reciprocates in the cylinder to open and close the valve. The piston includes a forward closing member 52 having a bullet shape. When the closing member is in the forward position as shown in FIG. 2, concrete cannot pass between the ends 42 and 44 of the T section. When the closing member is in the rearward position, concrete can easily flow through the valve. A hydraulic cylinder 54 drives the piston 50 between its two positions.

The piston 50 has a conically tapered section 56 positioned rearward of the closing member 52. A cup-shaped seal 58 is disposed rearwardly of the tapered section. The seal has a hollowed portion 60 with tapered sides 62. The inside diameter of the hollowed portion at its forward end is slightly greater than the minimum diameter of the tapered section. Accordingly, the seal 58 fits over the tapered section. A pressure plate 64 is positioned against the rearward, flat end of the seal. Three bolts 66, which are spaced 120° apart around the piston, hold the pressure plate against the seal. The bolts 66 extend through holes in the pressure plate 64 and seal 58 and have threaded ends 68 which are threadably engaged in the threaded holes of the tapered section 56. Tightening of the bolts allows the pressure plate 65 to apply pressure to the seal and keep it firmly engaged with the tapered section 56.

The piston 50 includes a central section 70 which extends rearwardly from the tapered section 56 and through corresponding central holes in the seal and pressure plate. The rod section 70 has an internally threaded hole 72 which is adapted to receive a threaded end 74 of a hydraulic cylinder plunger 76. A retaining bolt 78 projects laterally through holes in the plunger 76 and rod section 70 to help prevent stripping of the threads of hole 72 under extreme loading. The rearward end of the rod section 70 is formed as a nut 80 to facilitate engagement with a wrench to turn the rod section.

The cylinder 48 is a section of pipe which is held in a groove 82 formed at the end of the T section leg 46. An end plate 84 is positioned over the rearward end of the cylinder. The hydraulic cylinder 54 has a face plate 86 which is spaced rearwardly of the end plate 84. Four long threaded rods 88 pass through corresponding holes in the face plate 86, end plate 84, and the rearward end 90 of the T section leg. The forward end 92 of each rod is threadably engaged with threads in the T section end 90. A nut 94 holds the end plate 84 securely against the rearward end of the cylinder 48. A pair of nuts 96 and 98 hold the face plate 86 of the hydraulic cylinder in position.

The cup-shaped seal 58 is constructed of a relatively pliable material such as polyurethane. It has a large thickness T on the order of one-half the diameter of the piston. This provides a large sealing area between the circumference of the seal and the walls of the cylinder, to prevent the passage of sap. Also, this prevents substantial tilting of the seal. Generally, a thickness T of at least one-fourth the diameter D of the seal is necessary to achieve good sealing action and prevent tilting. The unexpanded diameter of the seal 58 is generally slightly less than that of the inside of the cylinder 48 to allow installation of the piston. The closing member 52 and pressure plate 64 are generally provided with a definite clearance with the inside of the cylinder. After the piston is installed, the bolts 66 can be tightened to force the pressure plate 64 tightly against the seal. This causes the expansion of the seal 58, and therefore enables the prevention of large sap leakage.

The width W of the lip portion of the seal between the point where it contacts the rearward end of the tapered section 56 and the cylinder 48 is large, being on the order of $\frac{1}{10}$ the diameter D of the piston. As a result, expansion forces supplied by the tapered section 56 are distributed to a large area of the seal. This causes the expansion of a considerable thickness of the seal so that a long tight sealing area is maintained between the body of the seal and the cylinder. A ledge area 67 is formed at the widest part of the tapered section so that the wide lip portion can be accommodated.

After substantial use of the valve, the seal will wear, and this will be indicated by the leakage of sap past the seal. The bolts 66 are then tightened to press the seal down against the tapered section 56 to provide a new sealing area in contact with the cylinder. The tightening of the bolts 66 can be easily accomplished when the piston is in its rearward position, and without requiring dismantling of the valve. Generally, it can be accomplished in less than a minute, resulting in a minimum downtime of the pump.

After substantial use, the cylinder 48 may be worn and have to be replaced. Replacement is simplified by the provision of the grooved end 90 in the leg of the T section. The threaded rods 88 are loosened, and the hydraulic cylinder 54 is lifted together with the piston 50 attached thereto. The cylinder 48 is then replaced with another, and the rods 88 are retighteend. This can be accomplished quickly. The straight cylinder 48 is merely a smooth section of pipe without special ends, and therefore is relatively inexpensive.

The closing member 52 at the forward end of the piston is subject to considerable wear by the movement of concrete through the T section. In prior art valves, the closing section 52 was generally constructed of rubber so it could expand to aid in sealing, and pieces of the rubber were torn away after a period of use. Because of the provision of the seal 58 in the present invention, the closing member 52 does not have to expand to help in the sealing. Accordingly, a hard material such as steel can be used for the closing member to provide a long life.

After a period of use, it is found that the forward end 100 of the closing member becomes worn away, although it still remains rounded and smooth. In order to permit substantially complete stoppage of flow when the valve is closed, the closing member 52 must reach to the opposite end of the T section 40 when the valve is closed. In accordance with the present invention, provisions are made for enabling a rapid adjustment of the position of the closing member 52. Such a position adjustment is accomplished by turning the two nuts 96 and 98 on each of the rods 88 to move the hydraulic cylinder 54 forward. The cylinder 54 is moved forward until the forward end 100 of the closing member seats against the opposite side of the T section. Such an adjustment can be made without disassembling the valve, and in a very short time.

Valves have been constructed in accordance with the above and tested in concrete pumping applications. The typical lifetime of the seal 58 is 20,000 cubic yards of pumped concrete, and the life of the closing member 52 is even longer. This may be compared with previous valves wherein the rubber closing member had a life on the order of four to five thousand cubic yards, and the packing glands had lives of less than 1,000 cubic yards, only several hundred of which were trouble free. During the lifetime of the seal, it can be readily adjusted every thousand cubic yards or so by tightening the bolts 66, to maintain good sealing action. Also, after every several thousand cubic yards, the nuts 96 and 98 can be adjusted to keep the closing member 52 in closing engagement with the T section to prevent return of pumped concrete. Both of these operations can be performed rapidly, and without disassembling the valve.

After perhaps 20,000 cubic yards of concrete have been pumped, the seal 58 may have to be replaced. Although the valve must be at least partially disassembled, the replacement can be accomplished without excessive downtime. As mentioned above, the cylinder 48 can also be replaced rapidly and at low cost.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. A valve comprising:
    cylinder means; and
    piston means for reciprocation in said cylinder means, said piston means having a closing member at its forward end, a tapered expander section disposed rearwardly of said closing member, a seal having a hollowed section disposed against said tapered section, and means for pressing said seal against said tapered section to expand it into sealing engagement with said cylinder means;
    said seal being free of inwardly extending discontinuities immediately rearwardly of the seal portion in contact with said tapered expander section, whereby to enable forward movement of said seal.

2. A valve as defined in claim 1 wherein:
    the sides of the hollow portion of said seal are tapered between the seal portion in contact with said tapered expander section and a seal region spaced rearwardly of said seal portion.

3. In a valve having a T section with a cross portion through which material flows and a leg cylinder within which a piston reciprocates to control flow through said cross portion, the improvement of a piston comprising:
    a closing member;
    a tapered piston section disposed rearwardly of said closing member;
    a seal of cup-like configuration with its hollowed portion having tapered sides engaged with said tapered piston section, said hollow portion forming an empty region between a rearward end of said tapered piston section and the rearward portion of said seal to allow forward movement of said seal;
    pressure plate means disposed on an end of said seal opposite said tapered piston section; and
    means extending through said seal for compressing said seal between said pressure plate means and said tapered piston section.

4. A valve comprising:
    cylinder means;
    piston means for reciprocation in said cylinder means, said piston means having a closing member at its forward end, a tapered section disposed rearwardly of said closing member, a seal having a hollowed section disposed against said tapered section, and means for pressing said seal against said tapered section to expand it into sealing engagement with said cylinder means;
    piston driving means having a housing and reciprocating means extending from said housing for reciprocating said piston means;
    means extending through said seal for coupling said reciprocating means to said closing member; and
    means adjustably supporting said housing of said piston driving means on said cylinder means to vary the distance between them, whereby to enable the adjustment of the position of said closing member.

5. A valve comprising:
    cylinder means including a T pipe section having a leg, said leg having a face with groove means in it, a cylinder having a first end disposed in said groove means and a second end, an end plate disposed against said second end of said cylinder, and a plurality of rods disposed about said cylinder and extending between said end plate and said face of said leg; and
    piston means for reciprocation in said cylinder means, said piston means having a closing member at its forward end, a tapered section disposed rearwardly of said closing member, a seal having a hollowed section disposed against said tapered section, and means for pressing said seal against said tapered section to expand it into sealing engagement with said cylinder means.

6. The valve described in claim 5 wherein:
    said plurality of rods have a threaded portion extending rearwardly of said end plate; and including
    means for reciprocating said piston including plunger means engaged with said piston, a housing having holes through which said rods project, and nuts threadably engaged with said rods at positions forward and rearward of said holes in said housing.

7. A valve comprising:
    a cylinder means; and
    piston means for reciprocation in said cylinder means, said piston means having a closing member at its forward end, a tapered section disposed rearwardly of said closing member, a seal having a hollowed section disposed against said tapered section, a pressure plate disposed on a side of said seal opposite said tapered section, and a plurality of elongated members extending between said tapered section and said pressure plate through said seal.

References Cited

UNITED STATES PATENTS

| 2,217,834 | 10/1940 | Corbin | 251—324 X |
| 2,401,112 | 5/1946 | Saunders | 251—324 X |
| 2,596,891 | 5/1952 | De Frees | 251—324 X |
| 3,164,365 | 1/1965 | White et al. | 251—335 |
| 3,223,112 | 12/1965 | Ashbrook et al. | 251—324 X |

ARNOLD ROSENTHAL, Primary Examiner

U.S. Cl. X.R.

251—214, 324